(12) United States Patent
Naccache et al.

(10) Patent No.: US 11,403,639 B2
(45) Date of Patent: Aug. 2, 2022

(54) METHOD OF AUTO-DETECTION OF AN ATTEMPTED PIRACY OF AN ELECTRONIC PAYMENT CARD, CORRESPONDING CARD, TERMINAL AND PROGRAM

(71) Applicant: Banks and Acquirers International Holding, Paris (FR)

(72) Inventors: David Naccache, Paris (FR); Laurent Mayer, Courdimanche (FR)

(73) Assignee: BANKS AND ACQUIRERS INTERNATIONAL HOLDING, Paris (FR)

( * ) Notice: Subject to any disclaimer, the term of this patent is extended or adjusted under 35 U.S.C. 154(b) by 612 days.

(21) Appl. No.: 15/514,279

(22) PCT Filed: Sep. 24, 2015

(86) PCT No.: PCT/EP2015/071955
§ 371 (c)(1),
(2) Date: Mar. 24, 2017

(87) PCT Pub. No.: WO2016/046307
PCT Pub. Date: Mar. 31, 2016

(65) Prior Publication Data
US 2017/0278109 A1 Sep. 28, 2017

(30) Foreign Application Priority Data
Sep. 26, 2014 (FR) ...................................... 1459134

(51) Int. Cl.
*G06Q 20/40* (2012.01)
(52) U.S. Cl.
CPC ....... *G06Q 20/4016* (2013.01); *G06Q 20/409* (2013.01)

(58) Field of Classification Search
CPC .................... G06Q 20/4016; G06Q 20/409
USPC .......................................................... 705/75
See application file for complete search history.

(56) References Cited

U.S. PATENT DOCUMENTS

| 2009/0098825 | A1* | 4/2009 | Huomo | G06Q 20/20 455/41.1 |
| 2009/0132852 | A1* | 5/2009 | Sekiya | G06K 7/10811 714/15 |

FOREIGN PATENT DOCUMENTS

| EP | 2085921 A1 * | 8/2009 | ............. G06Q 20/40 |
| EP | 2085921 A1 | 8/2009 | |

OTHER PUBLICATIONS

International Search Report dated Oct. 12, 2015 for corresponding International Application No. PCT/EP2015/071955, filed Sep. 24, 2015.

(Continued)

*Primary Examiner* — Patrick McAtee
*Assistant Examiner* — Zesheng Xiao
(74) *Attorney, Agent, or Firm* — David D. Brush; Westman, Champlin & Koehler, P.A.

(57) ABSTRACT

A method of auto-detection of attempted piracy of an electronic payment card. The method includes the following acts implemented by the card: detection of a sequence of suspect operations implemented in interaction with the card, and storing in the card a corresponding suspect status; interaction of the card with a distinct entity and authentication, by the card, of the distinct entity; and communication, by the card, of the stored suspect status to the authenticated distinct entity.

7 Claims, 2 Drawing Sheets

(56) References Cited

OTHER PUBLICATIONS

Figure 1:
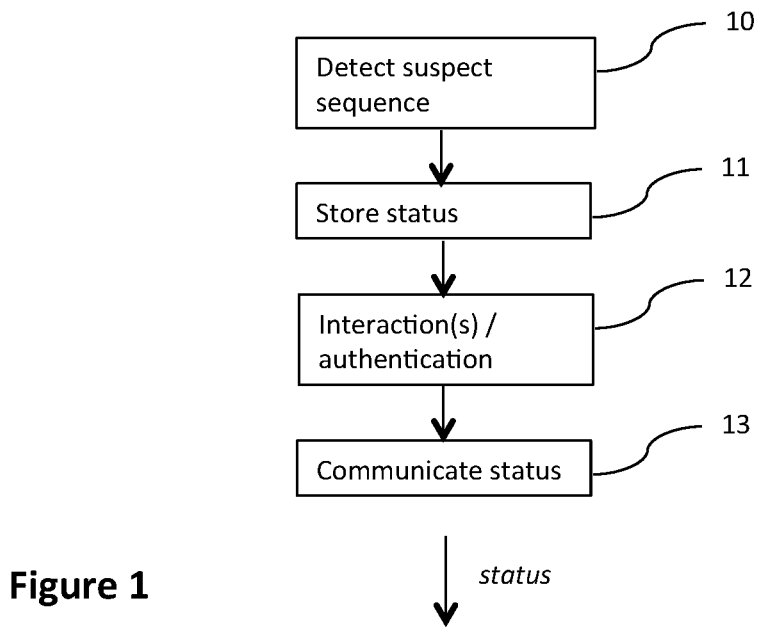

Written Opinion of the International Searching Authority dated Oct. 12, 2015 for corresponding International Application No. PCT/EP2015/071955, filed Sep. 24, 2015.
English Translation of International Preliminary Report on Patentability, dated Mar. 7, 2017 for corresponding International Application No. PCT/EP2015/071955, filed Sep. 24, 2015.
Teng et al., "Adaptive real-time anomaly detection using inductively generated sequential patterns", Proceedings of the Symposium on Research in Security and Privacy. Oakland, May 7-9, 1990; [Proceedings of the Symposium on Research in Security and Privacy], Los Alamitos, IEEE Comp. Soc. Press, US, vol. SYMP. 11, May 7, 1990 (May 7, 1990), pp. 278-284.

* cited by examiner

METHOD OF AUTO-DETECTION OF AN ATTEMPTED PIRACY OF AN ELECTRONIC PAYMENT CARD, CORRESPONDING CARD, TERMINAL AND PROGRAM

CROSS-REFERENCE TO RELATED APPLICATIONS

This Application is a Section 371 National Stage Application of International Application No. PCT/EP2015/071955, filed Sep. 24, 2015, which is incorporated by reference in its entirety and published as WO 2016/046307 A1 on Mar. 31, 2016, not in English.

1. FIELD OF THE INVENTION

The invention relates to the field of electronic payment and more particularly to the field of electronic payment cards.

2. PRIOR ART

Payment cards are subjected to numerous attempted attacks. The fact is that the nature of the information that an electronic payment card contains and the sensitivity of the data that it is used to process makes it an object of great value to malicious persons.

A certain type of fraud is tending to become widespread. This type of fraud is called "skimming", a fraudulent operation in which, unnoticed by the card-holder, the card's magnetic stripe is copied by means of a special device. This copying is done for example when the card is inserted into an automatic cash dispenser. This copied data is then transferred to a blank or virgin card for subsequent use. At the same time, the fraudulent individuals will have also retrieved the confidential code entered by the card-holder, for example by using a hidden camera or a device placed on or beneath the keypad of the automatic cash dispenser.

Once in possession of the falsified card and the confidential code, the fraudulent individual can carry out transactions or even access the user's bank account. And since the user will not have noticed anything and will still be in possession of his original card, it is only when he consults his bank balance that he will realize that he has been swindled.

Thus, in order to hack and clone a bank card, a fraudulent individual needs two types of information: the data stored in the card (bank data) and the four-digit personal and confidential code.

One way to contend this type of fraud is to try and spot the hacked or pirated devices such as automatic cash dispensers, for example by providing users with precise information so that they can recognize a dispenser that has been compromised (for example when the card insertion slot appears to be suspect). This approach however is not very efficient since fraudulent individuals are increasingly taking precautions against detection.

In another approach, which too must be implemented by the user, this user takes greater precautions when entering a confidential code, by placing his hand on top of the keypad for example so as to thwart that part of the hacking or piracy that involves the filming of the code entry operation by means of a camera. This solution is not very efficient since the user does not know where this camera is situated and since not all users remember to take such precautions.

The existing techniques are therefore limited to the detection of hacked devices and to the vigilance of the users in thwarting such fraudulent activity.

There is therefore a need to provide a technique that can be used to detect fraud or attempted fraud by modification of a user's bank card and that counters the negative effects of such fraud.

3. SUMMARY OF THE INVENTION

The invention proposes a novel solution that does not have all these drawbacks of the prior art, in the form of a method for the auto-detection of an attempt to hack an electronic payment card, comprising the following steps implemented by the card:
  detecting a sequence of suspect operations implemented in interaction with the card and storing a corresponding status, called a suspect status, in the card;
  interaction of the card with a distinct entity and authentication, by the card, of the distinct entity;
  communication, by the card, of the stored suspect status, to the distinct authenticated entity.

Thus, the invention propose a novel and inventive solution to the detection of bank card fraud involving especially hacking through the copying of data from a bank card (as well as the obtaining of the corresponding confidential code), the solution being based on the auto-detection, by the card itself, of a hacking attempt.

To this end, the bank card itself detects the fact that operations carried out by the fraudulent individual (in which the data of the card is read without the performance of a full transaction) are suspect and stores a particular status representing an attempted hacking. Subsequently, when the same card is used by an authentic device, the card communicates its suspect status so that the card user or the device user is alerted.

In this way, if the user has not detected the fraudulent device (for example a modified automatic cash dispenser) used to hack into his bank card by copying data of the card and to obtain his confidential code through a camera while he is entering this code, the proposed solution makes it possible to detect this hacking the next time this hacked card is used.

The user is then informed that his card has been hacked and that he must contact his bank in order to block it and prevent subsequent fraudulent uses.

Contrary to the inefficient preventive techniques of the prior art, the proposed solution is therefore based not on the detection of devices modified to enable hacking, but on the auto-detection, by the card itself, of an attempted hacking or an actual act of acting.

According to one particular characteristic of the invention, the step for detecting a sequence of suspect operations comprising the detection of a sequence of operations does not correspond to a predetermined sequence of operations enabling the full performance of a bank transaction.

This, according to this particular embodiment, the bank card itself detects the fact that the operations implemented by the fraudulent individual do not correspond to a full sequence of operations necessary for carrying out a transaction and are therefore suspect.

Indeed, the operations authorized for an electronic payment card are all known and standardized, and enable especially the finalizing of a transaction. Thus, when only some of the operations belonging to a sequence of transactions are implemented, the card can detect abnormal behavior and therefore store a suspect status, representing a hacking attempt.

For example, the distinct entity corresponds to an electronic payment terminal and the step of authentication corresponds to a step for implementing a full transaction via the electronic payment terminal.

Thus, according to this particular embodiment, the bank card is capable, itself, of authenticating a distinct entity, for example an electronic payment terminal.

Indeed, when a full transaction is implemented with the card in an electronic payment terminal, this card deduces from this that the electronic payment terminal is authentic and that it can communicate its own (preliminarily stored) particular status, representing a fraudulent attempt, to this terminal in order to alert it.

Thus, when the already hacked card is used, conventionally, for a full transaction via an authentic electronic payment terminal, the card, which is still inserted in the electronic payment terminal, activates the communication of its suspect status to the electronic payment terminal.

According to one particular aspect of the invention, the step for detecting is secured and the storage of its suspect status is guaranteed whatever the operations performed.

Thus, according to this particular embodiment, the bank card can detect a sequence of suspect operations whatever these operations, including cases where they include a resetting of certain pieces of data of the card.

Indeed, the suspect status is stored in a protected zone of the memory of the card.

For example, the communications step comprises a substep of transmission of at least one command for displaying an alert or warning message on a screen of the distinct entity.

Thus, according to this particular embodiment, the communication by the card of its suspect status enables, for example, the direct display of a warning on the screen of the electronic payment terminal into which the card is inserted or with which the card has implemented the full transaction.

In this way, the user who is the holder of the hacked card and/or the merchant in possession of the electronic payment terminal can view the warning message and thus be informed of an attempt, if any, to hack into the card.

According to one particular characteristic of the invention, the method comprises a step for the processing, in the distinct entity, of the suspect status communicated by the card.

Thus, according to this particular embodiment, the authenticated entity that has received the status representing a attempt at fraud by the card implements a step for processing this status in order to warn the card-holder for example or else the user of the authenticated entity (the merchant using an electronic payment terminal).

For example, the processing of the status leads to the display of a warning message on the screen of the authenticated entity or again generates the sending of a warning sound signal.

According to another example, this processing consists in sending a message to a remote server (for example, the bank server with which the previous transaction was made), and this server then directly informs the card-holder or the user of the authenticated entity about the attempted fraud on the card.

The invention also concerns an electronic payment card comprising means of auto-detection of a hacking attempt, and the following means:
  means of detection, for example in the form of a detection module, of a sequence of suspect operations implemented in interaction with the card and means of storage, for example in the form of a storage module, for the storage in the card of a corresponding status, called a suspect status;
  means of interaction, for example in the form of an interaction module, of the card with a distinct entity and means of authentication, for example in the form of an authentication module, for the authentication of the distinct entity by the card;
  means of communication, for example in the form of a communications module, for the communication of the stored suspect status by the card to the distinct authenticated entity.

The invention also relates to an electronic payment terminal comprising means for processing a suspect status received from an electronic payment card.

Finally, the invention relates to a computer program product downloadable from a communications network and/or stored on a computer-readable carrier and/or executable by a microprocessor, and comprising program code instructions for executing a method of auto-detection as described here above when it is executed on a computer.

4. FIGURES

Figure 2:
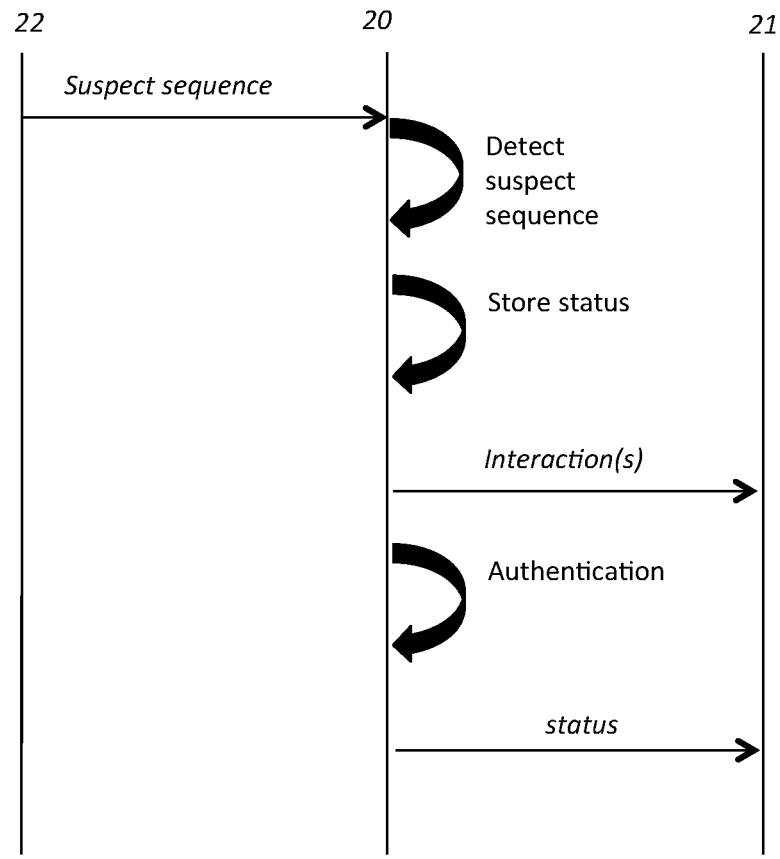
Figure 3A:
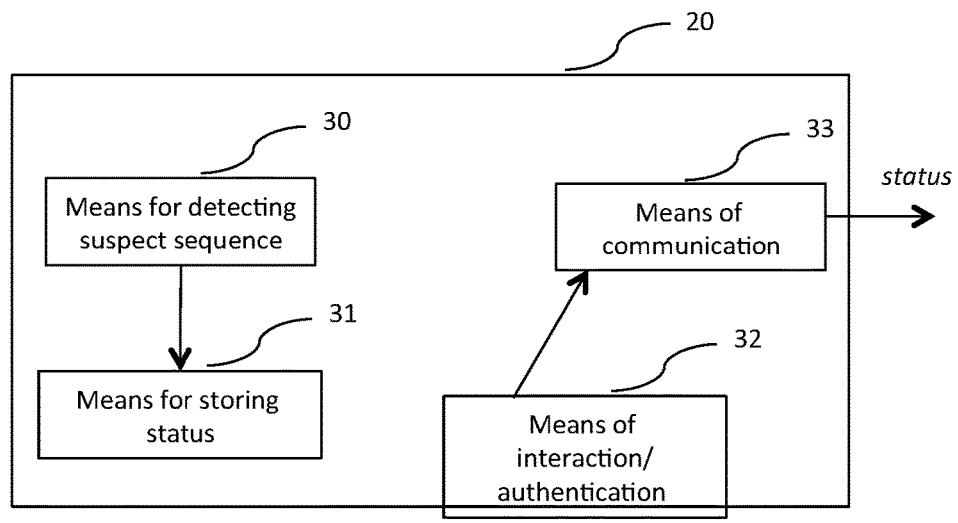
Figure 3B:
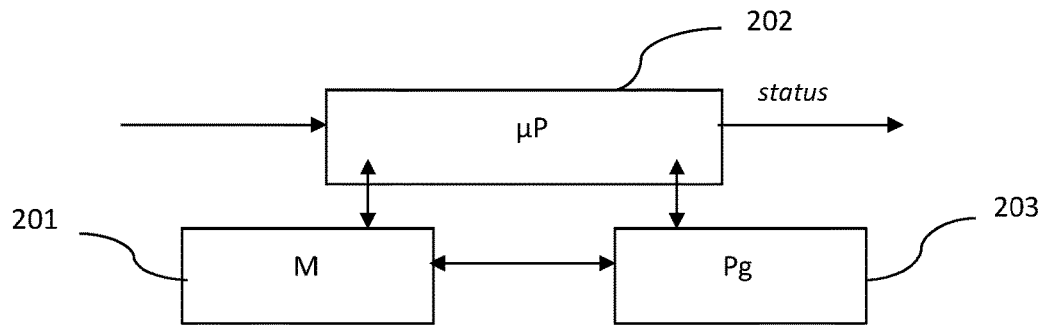
Figure 4:
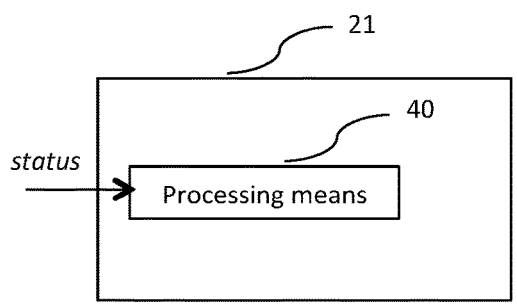

Other features and advantages of the proposed technique shall appear more clearly from the following description of a preferred embodiment, given by way of a simple illustratory and non-exhaustive example and from the appended drawings, of which:

FIG. 1 presents a block diagram of the proposed technique, according to one particular embodiment;

FIG. 2 is a sequence diagram of the proposed technique, according to one particular embodiment;

FIGS. 3a and 3b present two examples of an electronic payment card according to one particular embodiment of the proposed technique;

FIG. 4 presents an example of a payment terminal according to one particular embodiment of the proposed technique.

5. DESCRIPTION 5.1. General Principle

The general principle of the proposed technique, described with reference to FIGS. 1 and 2, is based on the auto-detection, by an electronic payment card, of fraud or attempted fraud on this card and on the storage, by the card, of a suspect status with a view to its subsequent communication to a distinct preliminarily authenticated entity.

Thus, the electronic payment card is capable of detecting suspect interactions between a distinct entity and itself, and of storing a suspect state/status pertaining thereto. Then, when this same card is used in an entity that it is capable of authenticating, the card communicates its suspect status to this entity, so as to warn one or more users about the attempted fraud (or about the actual fraud).

To this end, the electronic payment card comprises specific means according to the different embodiments described here below.

5.2. Description Embodiments

Referring to FIG. 1, a description is now given of the main steps of the method of auto-detection implemented in an electronic payment card, according to one particular embodiment of the invention.

The first step of detection 10 consists of the detection, by the card itself, of a sequence of suspect operations/interactions, for example when this card is inserted into an electronic payment terminal, a payment accessory or a cash dispenser.

For example, this sequence of operations, deemed to be suspect operations, corresponds to only one part of the predetermined operations (for example the steps of a transaction as defined by the EMV (Europay Mastercard Visa)) necessary for the implementing of a bank transaction. Thus, the electronic payment card according to this embodiment of the invention detects a suspect sequence when a halt is detected in any one of the obligatory, predetermined steps. Such a sequence, considered to be suspect, leads to the storage, in a step 11, of a suspect status by the card itself.

For example, this storage 11 consists of the modifying of a status bit in a specific part of the memory of the electronic chip of the card or the storage of a particular sequence of bits (corresponding to commands to be executed by the receiver device of this sequence of bits for example) in a specific part of the memory of the electronic chip of the card.

According to this particular embodiment of the invention, the storage of the suspect status of the card is always possible, whatever the operations implemented on the card. Thus, if the fraud consists in copying out and then erasing all or part of the memory of the card, the storage zone of the suspect status is saved. For example, this storage is done in a specific zone of the memory not accessible to a fraudulent individual, if any, or non-erasable.

This embodiment is only one non-exhaustive example of an embodiment and it is clear that many other embodiments of the invention can be envisaged for the storing of the status by the card.

Once the status is stored, the electronic payment card can then communicate it, as needed, to any trusted device so as to warn a user, for example the card-holder, about the fraud or attempted fraud.

For example, when a user uses the electronic payment card in an electronic payment terminal or a cash dispenser after the hacking event, the card communicates its suspect status once it is in a position to authenticate the device in question.

To this end, when the card is again interacting with a distinct entity, it implements a step 12 for authenticating this entity so that, in a step 13, it can then communicate its suspect status to this entity.

For example when the card sees, this time, that a full bank transaction is being implemented with the distinct entity, then the card considers this entity to be authentic. Indeed an electronic payment terminal or cash dispenser enabling a full bank transaction can be considered to be authentic and trustworthy by the electronic payment card. Such an authenticated entity furthermore enables the suspect status of the card, or even an immediate warning, to be communicated through the display means of this entity.

Thus, during the use of the bank card (for a transaction in an electronic payment terminal or a withdrawal of money from a cash dispenser), the hacked electronic payment card takes the opportunity of its interaction with a distinct entity that it considers to be authentic to communicate its suspect status (previously stored during a hacking or attempted hacking) to this entity.

Then, the distinct entity that has received this communication of suspect status of the electronic payment card implements one or more steps making it possible to take account of this suspect status in order to send out a warning.

For example, the reception of the suspect status coming from the card automatically triggers the display, by rendering means of the distinct entity (the screen of an electronic payment terminal), of a warning message indicating that the card has undergone a hacking attempt or a hacking and that it must be verified.

According to another example, the reading of the communicated suspect status triggers the execution of one or more one or more commands enabling the display, by rendering means of the distinct entity, of a warning message indicating that the card has undergone a hacking attempt, or actual hacking, and that it must be verified.

According to yet another example, the reading of the communicated suspect status triggers the execution of one or more commands enabling the transmission, by the distinct entity, to a distant server (for example the server of the banking institution that has issued the card) or a pre-identified device (for example the card-holder's mobile phone), of a warning, in such a way as to inform a pre-identified user (the card-holder for example).

The steps described here above are also illustrated in FIG. 2, in the form of a sequence diagram involving a hacked device 22, the electronic payment card 20 that is the object of the invention and a distinct authenticated entity 21.

According to one particular embodiment of the invention, the electronic payment card 20 detects a sequence of suspect operations, in interaction with a device 22 (for example a hacked cash dispenser). For example, the card detects the fact that only some of the steps needed to implement a bank transaction are implemented. From this, it deduces that it has been hacked or that it has undergone a hacking attempt. It then stores a particular status called a «"suspect"» status so that, as soon as possible, it can then communicate this status to an entity capable of providing a warning about this hacking attempt.

Thus, when the card 20 again goes into interaction with a distinct entity 21 (a cash dispenser, an electronic payment terminal, a payment accessory etc.), it makes sure of the authenticity of this entity and then sends it its suspect status.

For example, the card 20 deduces that the electronic payment terminal 21 into which it is inserted is authentic when a full bank transaction has been implemented, i.e. when all the predetermined step/operations necessary for a transaction have been performed. Once the distinct entity 21 in interaction with the card 20 is authenticated, this card can send it its suspect status.

The distinct authenticated entity 21 can then process this suspect status so as to generate a warning, by displaying a message on its screen for example, or by sending a warning message addressed to a remote server or to a pre-identified device (for example the mobile telephone of the card-holder).

Thus, according to the different embodiments described here above, the invention enables the auto-detection, by a payment card, of a hacking or hacking attempt and the communication, as soon as possible, of a suspect status stored by the card to a distinct authenticated entity.

The fraud is therefore detected by the card itself and disclosed rapidly (at the very next use of the card for payment for example) so as to enable the user to take the necessary steps so that the hacking has the least negative effects possible. Indeed, if the user is rapidly warned after the hacking, he can put an end to it without waiting whereas, at present, he can only realize that there has been fraud when he consults his account, at a time and when, potentially, numerous fraudulent transactions could have already been made.

5.3. Other Characteristics and Advantages

Referring to FIGS. 3a and 3b, a description is provided of an exemplary electronic payment card comprising means for executing the already described method of self-detection of a hacking attempt.

Thus, as illustrated in FIG. 3a, such an electronic payment card 20 comprises means 30 for detecting a sequence of suspect operations. The electronic payment card 20 comprises means 31 for storing a suspect status when a suspect sequence has been detected. The electronic payment card 20 also comprises means 32 for interacting and authenticating as well as means 33 for communicating the status pre-stored by the means 31.

This electronic payment card 20 is described with reference to FIG. 3b.

For example, the electronic payment card 20 comprises a memory 201 constituted by a buffer memory, a processing unit 202, equipped for example with a microprocessor and driven by the computer program 203, implementing a method of auto-detection of a hacking attempt as described here above.

At initialization, the code instructions of the computer program 203 are for example loaded into a memory and then executed by the processor of the processing unit 202. The processing unit 202 inputs for example a sequence of operations, in interaction with the card 20. The microprocessor of the processing unit 202 implements the steps of the method of auto-detection of a hacking attempt, according to the instructions of the computer program 203, to communicate a suspect status.

To this end, the electronic payment card 20 comprises, in addition to the buffer memory 201, means 30 for detecting a sequence of suspect operations, means 31 for memorizing a suspect status, when a suspect sequence has been detected, means 32 of interaction and authentication as well as means 33 for communicating the status previously stored by the means 31.

Finally, referring now to FIG. 4, a description is provided of an example of an electronic payment terminal 21 comprising means 40 for processing a status received from a payment card implementing the method of auto-detection of a hacking attempt according to the different particular embodiments of the invention.

These processing means 40 comprise for example means for reading the received status, means for executing commands included in the received status, such as for example means for displaying a warning or sending a warning message to another entity.

The invention claimed is:

1. A method for auto-detection of an attempt to hack an electronic payment card, wherein the method comprises the following acts implemented by said card:
   detecting a sequence of suspect operations implemented in an interaction of a first distinct entity with said card, comprising detecting a sequence of operations that does not correspond to a sequence of operations of a fully performed bank transaction, and storing a corresponding status, called a suspect status, in the card, wherein detecting comprises detecting that not all of the operations of the fully performed bank transaction are implemented or detecting a halt in any one of the operations of the fully performed bank transaction;
   interacting by said card with a second distinct entity corresponding to an electronic payment terminal, and authenticating, by said card, said second distinct entity, said act of authenticating corresponding to an act of implementing a full transaction via said electronic payment terminal; and
   communicating, by said card, said stored suspect status to said authenticated second distinct entity.

2. The method of auto-detection according to claim 1, wherein the corresponding status is stored in the card and said storage of said suspect status is done in a specific zone of the memory of said card, so that said storage is guaranteed whatever said performed operations.

3. The method of auto-detection according to claim 1, wherein said act of communication comprises a sub-act of transmission of at least one command for displaying a warning message on a screen of said second distinct entity.

4. The method of auto-detection according to claim 1, further comprising processing, in said second distinct entity, said suspect status communicated by said card.

5. The method of auto-detection according to claim 1, wherein:
   said electronic payment terminal is a first electronic payment terminal; and
   the first distinct entity corresponds to a second electronic payment terminal.

6. An electronic payment card configured for auto-detection of a hacking attempt, wherein the electronic payment card comprises:
   a non-transitory computer-readable medium comprising instructions stored thereon;
   a processor configured by the instructions to perform acts comprising:
   detecting a sequence of suspect operations implemented in interaction of a first distinct entity with said card, comprising detecting a sequence of operations that does not correspond to a sequence of operations of a fully performed bank transaction, and storing in said card of a corresponding status, called a suspect status, wherein detecting comprises detecting that not all of the operations of the fully performed bank transaction are implemented or detecting a halt in any one of the operations of the fully performed bank transaction;
   interacting by said card with a second distinct entity corresponding to an electronic payment terminal, and authenticating said second distinct entity by said card, said act of authenticating corresponding to an act of implementing a full transaction via said electronic payment terminal; and
   communicating said stored suspect status by the card to said authenticated second distinct entity.

7. A non-transitory computer-readable medium comprising program code instructions stored thereon for executing a method of auto-detection of an attempt to hack an electronic payment card when the instructions are executed on a processor of the electronic payment card, wherein the instructions configure the electronic payment card to perform acts comprising:
   detecting a sequence of suspect operations implemented in interaction of a first distinct entity with said card, comprising detecting a sequence of operations that does not correspond to a sequence of operations of a fully performed bank transaction, and storing a corresponding status, called a suspect status, in the card, wherein detecting comprises detecting that that not all of the operations of the fully performed bank transaction are implemented or detecting a halt in any one of the operations of the fully performed bank transaction;
   interacting by said card with a second distinct entity corresponding to an electronic payment terminal, and authenticating, by said card, said second distinct entity, said act of authenticating corresponding to an act of implementing a full transaction via said electronic payment terminal; and communicating, by said card, said stored suspect status, to said authenticated second distinct entity.

\* \* \* \* \*